(12) United States Patent
Crawford et al.

(10) Patent No.: US 8,388,169 B2
(45) Date of Patent: Mar. 5, 2013

(54) LIGHT DEVICE HAVING THERMOSET COMPOSITE HOUSING AND ELECTRICAL INTERCONNECT

(75) Inventors: John D. Crawford, Avon, OH (US); Thomas D. Boris, Collegeville, PA (US)

(73) Assignees: Eveready Battery Company, Inc., St. Louis, MO (US); Streamlight, Inc., Eagleville, PA (US)

( * ) Notice: Subject to any disclaimer, the term of this patent is extended or adjusted under 35 U.S.C. 154(b) by 838 days.

(21) Appl. No.: 12/146,724

(22) Filed: Jun. 26, 2008

(65) Prior Publication Data

US 2009/0323344 A1 Dec. 31, 2009

(51) Int. Cl.
*F21L 4/04* (2006.01)
(52) U.S. Cl. ........ 362/202; 362/203; 362/204; 362/205; 362/206; 362/217.01; 362/217.1
(58) Field of Classification Search .................. 362/118, 362/202–206, 253, 373, 196, 217.01, 217.1
See application file for complete search history.

(56) References Cited

U.S. PATENT DOCUMENTS

| | | | | |
|---|---|---|---|---|
| 1,404,077 A | * | 1/1922 | Vince | 362/203 |
| 1,522,746 A | * | 1/1925 | Prew | 362/204 |
| 1,584,454 A | | 5/1926 | Koretzky | |
| 1,656,067 A | * | 1/1928 | Hendry | 362/205 |
| 1,960,739 A | | 5/1934 | Graubner et al. | |
| 2,166,282 A | * | 7/1939 | Benjafield | 362/205 |
| 2,373,306 A | * | 4/1945 | Gits | 362/203 |
| 2,779,344 A | * | 1/1957 | Hemmings et al. | 132/288 |
| 2,830,173 A | * | 4/1958 | Lambert | 362/205 |
| 2,902,643 A | * | 9/1959 | Pasquale | 324/507 |
| 3,079,492 A | * | 2/1963 | Bolinger | 362/189 |
| 3,497,798 A | * | 2/1970 | Schick | 324/506 |
| 3,711,768 A | * | 1/1973 | Frazin | 324/507 |
| 3,806,724 A | | 4/1974 | Tanner et al. | |
| 3,902,058 A | | 8/1975 | Naylor et al. | |
| 4,150,330 A | * | 4/1979 | Hudson et al. | 324/507 |
| 4,250,446 A | * | 2/1981 | Ponte | 324/506 |

(Continued)

FOREIGN PATENT DOCUMENTS

| | | |
|---|---|---|
| JP | 6168601 | 6/1994 |
| JP | 9223402 | 8/1997 |

(Continued)

OTHER PUBLICATIONS

"Hybrid Filament Wind/Pultrusion Manufacturing," from Glasforms, Inc., http://glasforms.com, ©0 2008, (2 pages).

(Continued)

*Primary Examiner* — Diane Lee
*Assistant Examiner* — Mary McManmon
(74) *Attorney, Agent, or Firm* — Michael C. Pophal; Price Heneveld LLP

(57) ABSTRACT

A light device is provided that includes a light source and electrical circuitry for supplying electrical power to the light source. The light device also includes a housing having first and second ends and a hollow interior defining a compartment for holding a power source. The housing comprises a woven fiber thermoset composite. The housing is made by applying woven fibers to a mandrel and impregnating the woven fibers with an epoxy and curing the epoxy impregnated woven fibers to form the thermoset composite housing. An electrical interconnect is provided within the housing having first and second resilient contacts for providing an electrical connection between the power source and the light source.

31 Claims, 9 Drawing Sheets

U.S. PATENT DOCUMENTS

| | | | |
|---|---|---|---|
| 4,408,263 A | 10/1983 | Sternlicht | |
| 4,484,253 A | 11/1984 | Roberts | |
| 4,495,551 A | 1/1985 | Foltz | |
| 4,516,194 A | 5/1985 | Johns | |
| 4,559,588 A | 12/1985 | Engelson et al. | |
| 4,563,728 A | 1/1986 | Bruggeman et al. | |
| 4,722,036 A | 1/1988 | Hastings | |
| 4,827,385 A | 5/1989 | Gammache | |
| 4,907,135 A | 3/1990 | Tarrson et al. | |
| 4,907,141 A * | 3/1990 | Wang | 362/205 |
| 5,158,357 A * | 10/1992 | McDermott | 362/204 |
| 5,262,728 A * | 11/1993 | Shershen | 324/506 |
| 5,400,227 A | 3/1995 | Maglica et al. | |
| 5,816,695 A * | 10/1998 | Lin | 362/392 |
| 5,895,112 A * | 4/1999 | Olivit et al. | 362/189 |
| 6,145,997 A | 11/2000 | Sedovic et al. | |
| 6,224,235 B1 * | 5/2001 | Parker | 362/190 |
| 6,283,611 B1 | 9/2001 | Sharrah et al. | |
| 6,491,409 B1 | 12/2002 | Sharrah et al. | |
| 6,722,076 B2 * | 4/2004 | Nielsen | 42/146 |
| 6,886,960 B2 | 5/2005 | Sharrah et al. | |
| 7,198,581 B1 * | 4/2007 | Black | 473/454 |
| 7,281,815 B1 | 10/2007 | Gustafson et al. | |
| 7,815,337 B2 * | 10/2010 | Grossman | 362/189 |
| 2004/0140771 A1 * | 7/2004 | Kim et al. | 315/86 |
| 2005/0206043 A1 | 9/2005 | Frankel | |
| 2007/0002559 A1 | 1/2007 | Uke | |
| 2007/0171084 A1 | 7/2007 | Potter | |
| 2008/0130271 A1 * | 6/2008 | Harris | 362/105 |

FOREIGN PATENT DOCUMENTS

| | | |
|---|---|---|
| JP | 11007802 | 1/1999 |
| WO | 2006099671 A1 | 9/2006 |

OTHER PUBLICATIONS

Sanjay Mazumda, "Composites Manufacturing: Materials, Product, and Process Engineering," published Dec. 27, 2001, pp. 150-157 and pp. 188-197.

Supplementary European Search Report from Application No. EP 08 77 2036 dated Oct. 25, 2012, 8 pages.

* cited by examiner

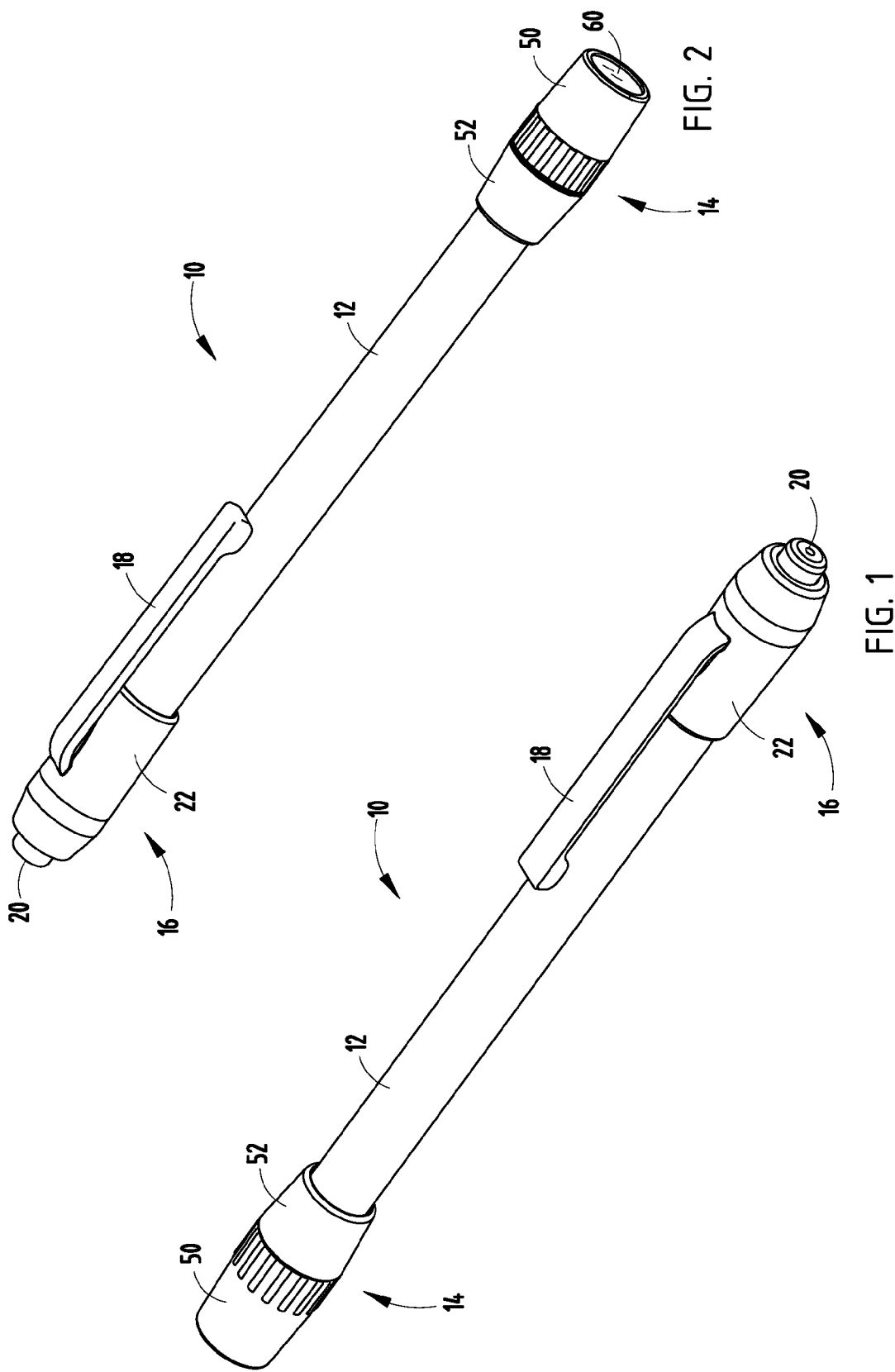

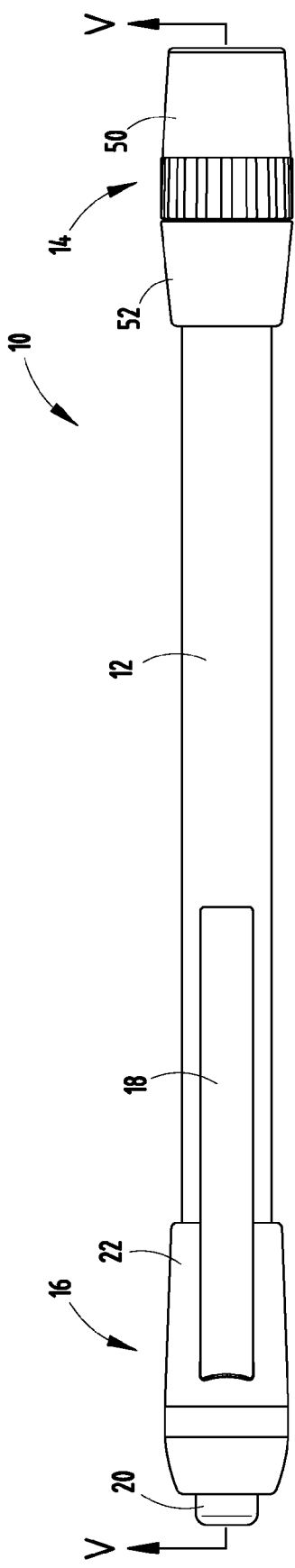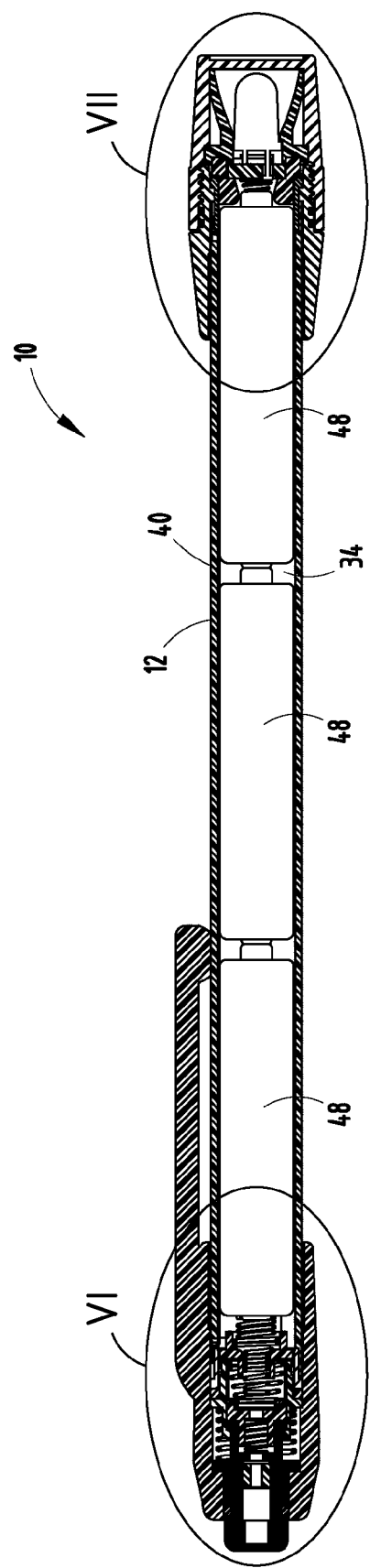

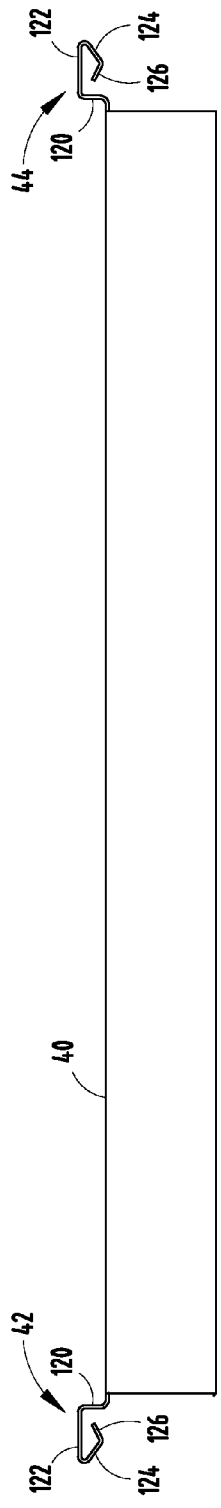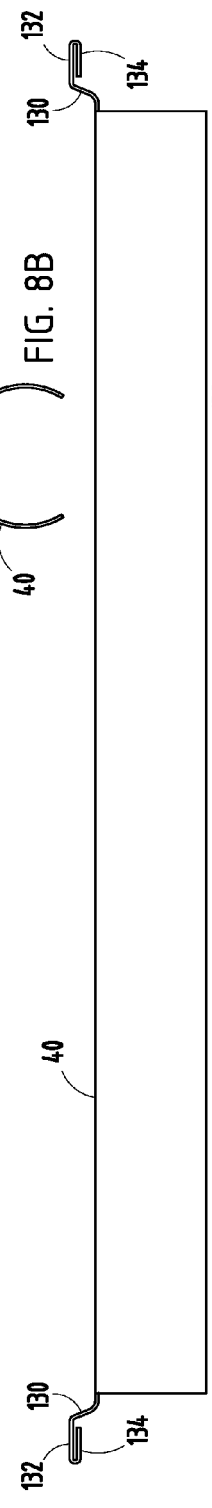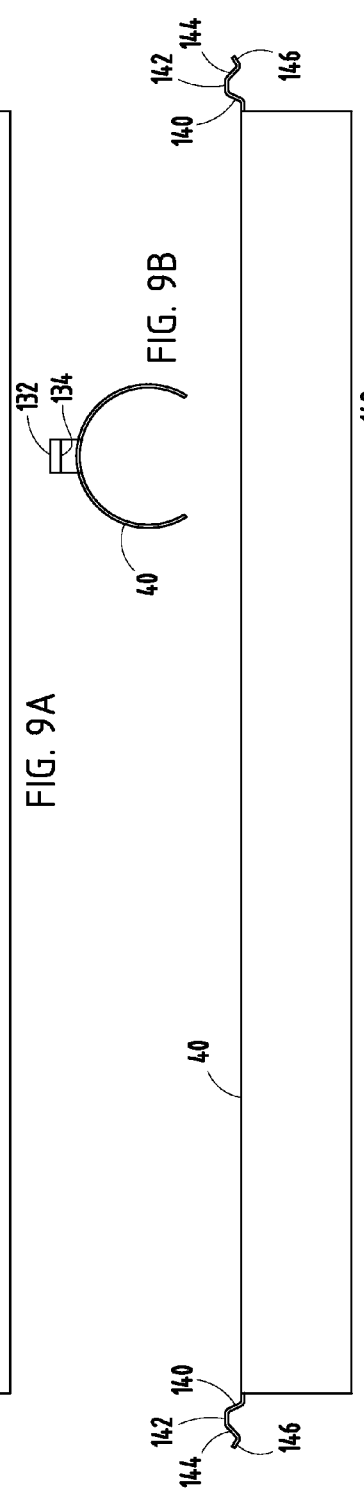

LIGHT DEVICE HAVING THERMOSET COMPOSITE HOUSING AND ELECTRICAL INTERCONNECT

BACKGROUND OF THE INVENTION

The present invention generally relates to lighting devices and, more particularly relates to a portable handheld light, such as a pen light having a thin elongated housing and electrical interconnect circuitry.

Small, slim handheld flashlights, commonly referring to "pen lights" are generally known in the handheld lighting device industry and are popular with industrial professionals, sportsmen and others. Pen lights are of relatively small diameter and allow users the ability to place the light in a pocket and insert the light into narrow spaces which would otherwise be impractical for larger diameter light devices.

There exist many durable conventional lighting devices, including pen lights, such as the Stylus® lights manufactured by Streamlight Incorporated, that are machined or extruded or drawn from aluminum which offers strength with a relatively thin housing wall. Other conventional lighting devices, including pen lights, are made of a molded polymeric material, such as thermoplastic. Conventional plastic flashlights generally require a relatively thick wall housing in order to achieve sufficient strength and typically requires additional components to provide a conductive circuit path between the battery terminals and the light source. While a number of plastic lighting devices exist which include electrical interconnects, many conductive interconnects are subject to failure due to corrosion, impact damage, and tolerance problems which may cause an intermittent connection and unreliable operation.

It is therefore desirable to provide for a light device that offers thin walls, lightweight and enhanced strength. It is further desirable to provide for such a light device that offers enhanced electrical interconnection.

SUMMARY OF THE INVENTION

According to one aspect of the present invention, a light device is provided. The light device includes a light source and electrical circuitry for supplying electrical power to the light source. The light device also includes a housing having first and second ends and a hollow interior defining a compartment for holding a power source. The housing comprises a woven thermoset composite.

According to another aspect of the present invention, a method of manufacturing a housing for a light device is provided. The method includes the steps of obtaining a mandrel having a diameter and a longitudinal axis, obtaining a fiber material and an epoxy, and applying the fiber material and the epoxy onto the mandrel, wherein the fiber material is woven. The method also includes the steps of curing the epoxy to provide a woven thermoset composite, removing the woven thermoset composite from the mandrel, and assembling a light source to the thermoset composite.

According to a further aspect of the present invention, a light device is provided. The light device includes a housing having a hollow interior, a first end, and a second end. The hollow interior defines a compartment for holding a power source. The light device also includes a light source. The light device further includes electrical interconnect circuitry for supplying electrical power to the light source. The electrical interconnect circuitry comprises an electrically conductive strip having first and second resilient portions that form first and second spring contacts. The first and second spring contacts provide electrical connection between the power source and the light source.

Accordingly, the light device employs a woven thermoset composite housing that advantageously provides for a strong and thin housing structure to realize a thin profile light device. Additionally, the light device provides for an enhanced electrical circuit connection between the power source and the light source.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 1 is a rear perspective view of a light device, according to one embodiment;

FIG. 2 is a front perspective view of the light device shown in FIG. 1;

FIG. 3 is a top side view of the light device shown in FIG. 1;

FIG. 5 is a cross-sectional view of the light device taken through line V-V of FIG. 3;

FIG. 8A is a side view of an electrical interconnect employed in the light device, according to a first embodiment;

FIG. 8B is a front view of the electrical interconnect shown in FIG. 8A;

FIG. 9A is a side view of an electrical interconnect employed in the battery, according to a second embodiment;

FIG. 9B is a front view of the electrical interconnect shown in FIG. 9A;

FIG. 10A is a side view of an electrical interconnect employed in the light device, according to a third embodiment;

FIG. 10B is a front view of the electrical interconnect shown in FIG. 10A;

DETAILED DESCRIPTION OF THE PREFERRED EMBODIMENTS

Figure 4:
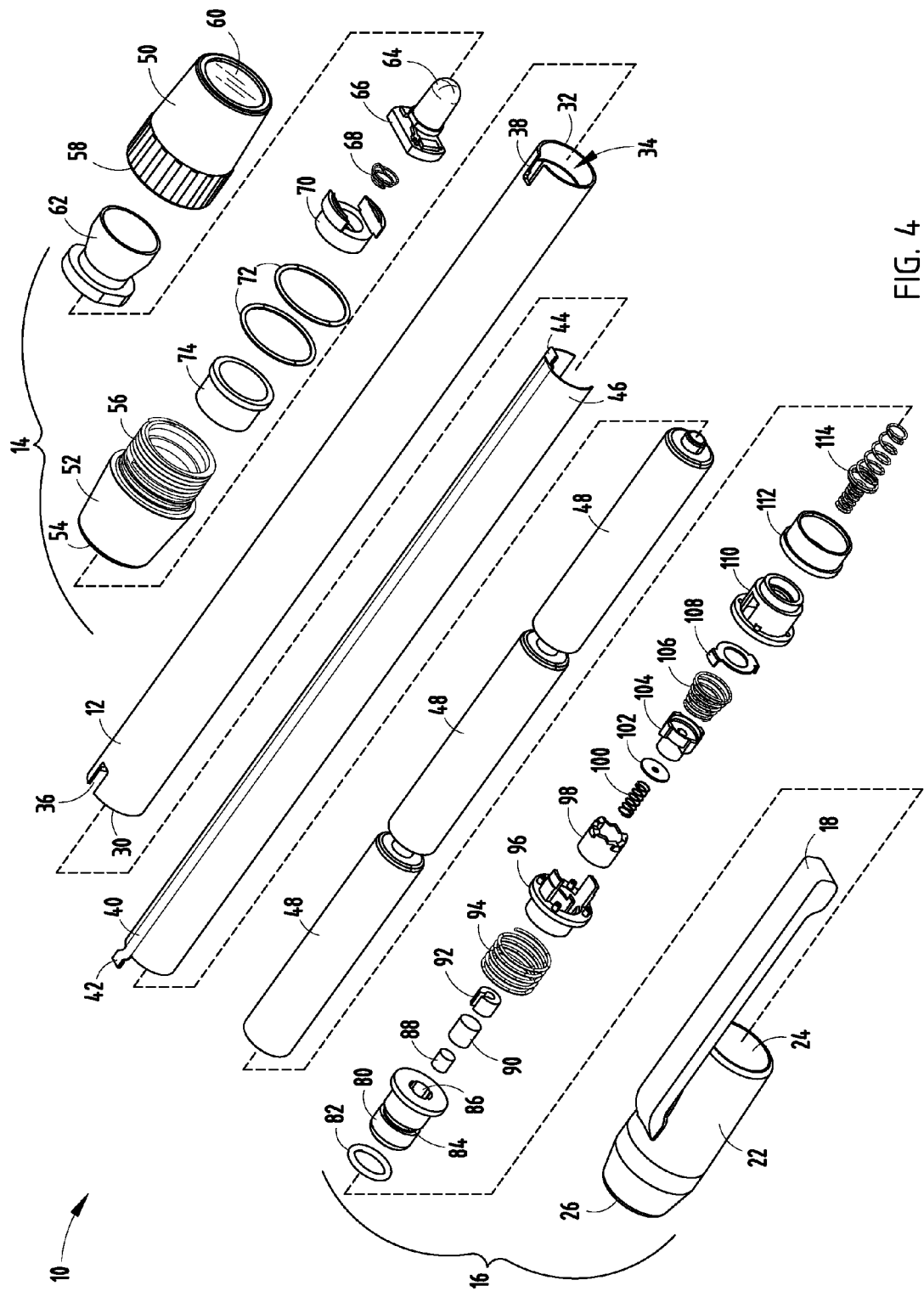
FIG. 4 is an exploded view of the light device shown in FIG. 1.

Before describing in detail embodiments that are in accordance with the present arrangement, it should be observed that the embodiments reside primarily in combinations of method steps and apparatus components related to a light device and method of making and operating thereof. Accordingly, the apparatus components and method steps have been represented, where appropriate, by conventional symbols in the drawings, showing only those specific details that are pertinent to understanding the embodiments of the light device and method of making and operating the same present invention so as not to obscure the disclosure with details that will be readily apparent to those of ordinary skill in the art having the benefit of the description herein. Further, like reference characters in the description and drawings represent like elements.

In this document, relational terms, such as first and second, front and rear, top and bottom, and the like, may be used to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional elements in the process, method, article, or apparatus that comprises the element.

Referring now to FIGS. 1-7, a light device 10 is illustrated according to one embodiment of the present invention. The light device 10 shown and described herein is generally configured as a pen light, having a thin elongated housing 12, a front end cap assembly 14 containing the light source and a rear end cap assembly 16 containing the on/off switch. However, it should be appreciated that the light device 10 may be configured in various other shapes and sizes, according to other embodiments. As best seen in FIGS. 1-3 and 5, the front end cap assembly 14 is provided at a first end of the housing 12 and generally includes a lens ring 50, lens retainer 52, optics lens 60 and a light source, such as a light emitting diode (LED) 64. The rear end cap assembly 16 provided at the opposite second end of housing 12 generally includes a front end cap 22 containing a switch assembly that includes a push button switch 20 for activating the light device 10 to turn the light source on and off. Additionally, the front end cap 22 has a retaining clip 18 integrally formed therewith or assembled thereto which allows the light device 10 to be clipped to a supporting structure.

Referring to FIGS. 4 and 5, the housing 12 is generally cylindrical or tube-shaped, and is defined by a thin wall made of a woven fiber thermoset composite material that is electrically non-conductive (dielectric). The housing 12 has a hollow interior 34 defining a compartment for receiving various components including a power source and electrical circuitry for supplying electrical power to the light source. The power source is shown including three generally cylindrical batteries 48, connected in series, according to one embodiment. It should be appreciated that any one or a plurality of electrochemical battery cells may be employed in series and/or parallel connection as the power source. In the exemplary embodiment, the three electrochemical cell batteries 48 each are AAAA-size batteries, each generally having an outside diameter of about 8.306 mm (0.327 inches). Each battery 48 typically provides a voltage supply of about 1.5 volts for a total series connected voltage potential of about 4.5 volts, according to the disclosed embodiment. The housing 12 is generally tubular in shape and has an internal diameter that is slightly greater than the outside diameter of the batteries 48. Since the housing 12 has a thin wall, the outside diameter of the housing is small so as to provide a thin light device 10.

With particular reference to FIG. 4, the housing 12 is generally illustrated in the shape of an elongated thin tube having a rear first open end 30 and a front second open end 32. Additionally, a first generally rectangular slot 36 is formed in the first rear end 30 of the housing 12 to matingly receive a first spring contact 42 of an electrical interconnect 40. A second generally rectangular slot 38 is formed in the second open end 32 of the housing 12 to matingly receive a second spring contact 44 of the electrical interconnect 40.

The housing 12 is generally made of a thermoset composite material that is relatively thin and sufficiently strong to resist breakage during normal use. The thermoset composite housing 12 is made of a woven fiber material and an epoxy, according to one embodiment. The woven fiber material is weaved into a pattern and held together by the epoxy that, once cured, provides a structurally durable housing 12. In one embodiment, the fiber material is a fiberglass comprising glass fibers. According to another embodiment, the fiber material may include carbon fibers. According to further embodiments, the fiber material may include a lightweight, strong aramid synthetic fiber produced from poly-paraphenylene, such as Kevlar®, commercially available from Du Pont, a synthetic polymer fiber such as nylon and other fibrous materials.

Figure 7:
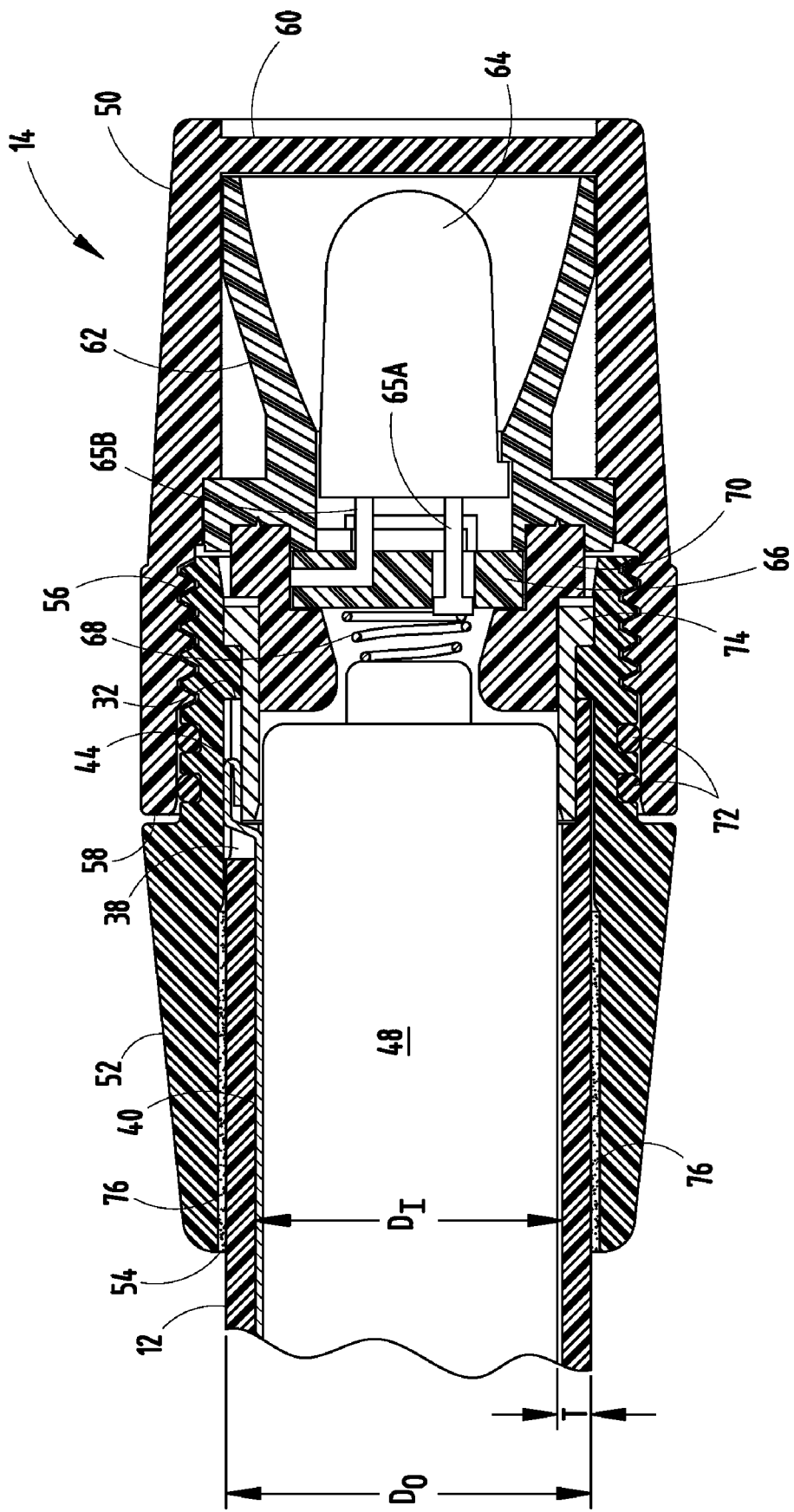
FIG. 7 is an enlarged cross-sectional view of section VII-VII taken from FIG. 5.

As seen in FIG. 7, the thermoset composite housing 12 is generally cylindrical or tube-shaped having an outside diameter $D_O$, an inside diameter $D_I$, and a thickness T. According to one embodiment, the thickness T of the housing 12 is less than 2.54 mm (0.100 inch), and more preferably less than 1.27 mm (0.05 inch). In an exemplary embodiment, the thickness T of housing 12 is about 0.762 mm (0.030 inch). According to one embodiment, the housing 12 has an inside diameter $D_I$ of about 8.70 mm (0.34 inch) and an outside diameter $D_O$ of about 10.20 mm (0.40 inch). It should be appreciated that the thermoset composite housing 12 has a ratio of thickness to outside diameter ($T/D_O$) that is less than 0.07, according to one embodiment. Various methods of making the thermoset composite housing 12 are shown and described herein.

Also disposed within the hollow interior 34 of housing 12 is electrical circuitry including an electrical interconnect 40, shown as an electrically conductive contact strip for providing an electrically conductive path between one terminal (negative terminal) of the rearmost battery 48 and the light source. In the embodiment shown, the electrical interconnect 40 provides a return path for electrical current from the light source to the negative terminal of the power source (batteries) 48. The electrical conductive strip 40 includes a first resilient portion 42 provided at a rear first end and a second resilient portion 44 provided at a front second end. The first and second resilient portions 44 and 42 form respective first and second spring contacts when compressed to provide high quality electrically connections to adjoining electrical conductive members to provide a sufficiently continuous electrical conductive path.

The electrical conductive strip 40 is shown with the first and second spring contacts 42 and 44 extending from a central portion 46 at opposite ends, both spring contacts 42 and 44 having a relatively narrow width portion as compared to the relatively wider width central portion 46, according to one embodiment. However, it should be appreciated that the electrically conductive strip 40 may have a uniform width or other alternative variation in width, according to other embodiments, e.g., a width comparable to the width of contacts 42 and 44. The wide central portion 46 of the electrical conductive strip 40 is formed having a curvature, including a C-shaped curvature or semi-cylindrical shape. The generally curved C-shape of the electrical conductive strip 40 generally conforms to the inside tubular shape of the housing 12 and provides hoop strength to the strip 40. The semi-cylindrical or C-shape may also provide memory such that it is resiliently compressed during insertion to the housing 12 and is spring biased against the interior surface of the housing 12. Additionally, it should be appreciated that the electrically conductive strip 40 may have a slight angle of curvature along the longitudinal axis thereof such that the contact strip 40 has additional memory that biases the contact strip toward the housing 12 and away from the batteries 48 which are disposed centrally within the hollow interior 34 of housing 12. By having a curvature that provides memory to the contact strip 40, the electrical conductive strip 40 may not interfere with the insertion and removal of the batteries 48 from the battery compartment of housing 12. It should be appreciated that the spring contacts 42 and 44 may be configured in various embodiments including those disclosed herein and described in connection with FIGS. 8A-10B. It should further be appreciated that the electrical conductive strip 40 may be disposed within a channel that extends longitudinally in the interior surface of the housing 12, according to another embodiment. Further, the electrical conductive strip 40 may be formed as one or more fibers extending longitudinally or in a pattern during the formation of the housing 12.

The electrical conductive strip 40 may be made of any of a number of electrically conductive materials. According to one embodiment, the electrical conductive strip 40 comprises beryllium copper which is resistant to corrosion and retains its form or shape under pressure while allowing sufficient flex during fabrication and assembly. According to another embodiment, the electrical conductive strip 40 may be made of brass. According to a further embodiment, the electrical conductive strip 40 may be made of aluminum.

The electrical conductive strip 40 is assembled in the light device 10 by inserting strip 40 into the interior hollow compartment 34 of housing 12 such that the first and second spring contacts 42 and 44 are aligned and extend upward through slots 36 and 38, respectively. The electrical conductive strip 40 generally abuts the inner surface of the housing 12 such that the batteries 48 may be inserted into compartment 34 radially inward from the contact strip 40. Additionally, it should be appreciated that a dielectric strip, such as tape, may be disposed between the electrically conductive strip 40 and the batteries 48, if desired. Further, an adhesive, such as a double-sided tape, may be disposed between the electrically conductive strip 40 and the interior surface of housing 12 to adhere the electrically conductive strip 40 to the housing 12.

Figure 6:
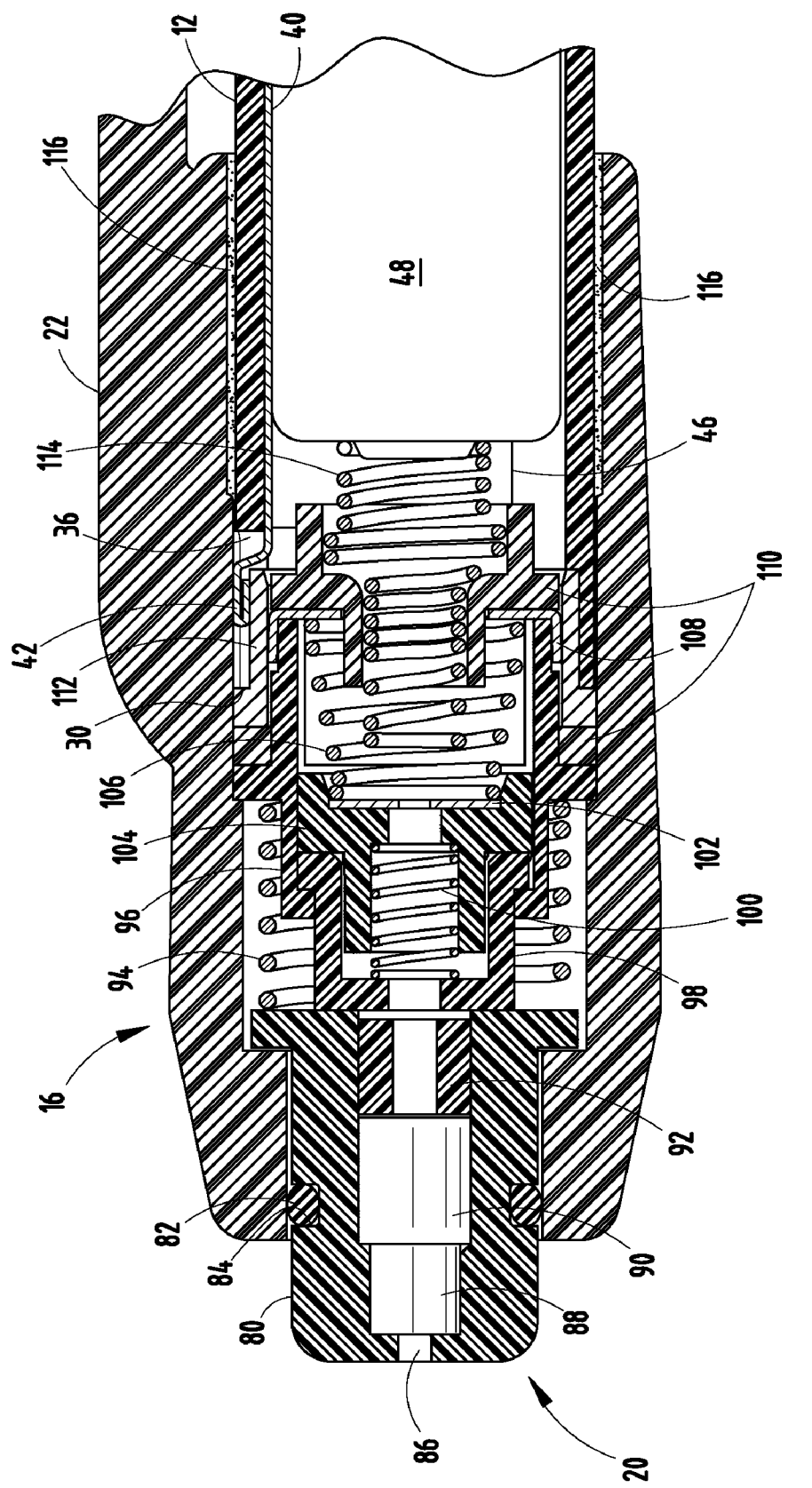
FIG. 6 is an enlarged cross-sectional view of section VI-VI taken from FIG. 5.

Referring particularly to FIGS. 4 and 6, the rear end cap assembly 16 is generally illustrated having various components assembled within the rear end cap or collar 22, which include components of the switch and the interconnecting electrical circuit components. Specifically, a switch button 80 is provided partially extending through end opening 26 in cap 22 and having a circumferential ring-shaped channel 84 into which an O-ring 82 is disposed to provide a seal tight closure at the opening 26 of the rear end cap 22. The rear end of the switch button 80 protrudes sufficiently outward through opening 26 such that it is depressible by a user to activate the switch to turn the light source on and off. The switch button 80 also includes a small opening 86 extending longitudinally therethrough into which a PTFE cartridge filter 88, such as a Porex® macroflow cartridge filter, is disposed. The filter 88 is permeable to allow gases to pass through while preventing water from passing through. Additionally, a getterer 90 and a getterer stopper 92 are also disposed within or adjacent to the switch button 80. The getterer 90 may serve to collect hydrogen gas or other gases that may accumulate within the light device 10. Disposed adjacent to the front end of switch button 86 is an outer spring 94 which biases the switch button 82 rearward. Disposed against the forward end of spring 94 is a rotor retainer 96 which engages a plunger 98. Disposed within the plunger 98 is a plunger spring 100 which contacts a rotor 104. The rotor 104, in turn, engages a contact disk 102 and a rotor spring 106 which contacts a contact strip 108. The contact strip 108 is generally ring shaped with a pair of peripheral tabs that, in turn, make contact with a conductive metal ring (or bushing) 112. The conductive metal ring 112, in turn, is in contact with the resilient portion 42 of electrical conductive strip 40. Additionally, a spring retainer 110 is provided that retains a spring 114 which biases the three series connected electrochemical cell batteries 48 forward into electrical contact with the front end cap assembly 14.

In the embodiment shown, the end cap or collar 22 of the rear end cap assembly 16 essentially contains the various components 80-114 of the user actuatable on-off switch. The various components of the switch may be preassembled and installed into the cap 22 prior to assembly of cap 22 onto the housing 12. To turn the light device 10 on and off, a user depresses the switch button 80 which changes the state of the electrical connection between open and closed circuit positions as should be evident to those skilled in the art. According to one embodiment, the light device 10 may employ a switch as disclosed in either of U.S. Pat. Nos. 6,886,960 and 6,491, 409, the entire disclosures of which are hereby incorporated herein by reference. It should be appreciated that other switches and variations of the switch disclosed may be employed in the light device 10.

The end cap 22 of the rear end cap assembly 16 essentially contains components 80-114 of the switch generally disposed therein when cap 22 is assembled onto the rear end 30 of thermoset composite housing 12. In doing so, the rear end cap 22 has a generally cylindrical inner surface 24 sized such that cap 22 slides over the outer surface of the rear end 30 of housing 12 and is adhered thereto by way of an epoxy adhesive 116. According to one embodiment, the epoxy 116 is applied to at least one of the interior surface 34 of the end cap 22 and the outer surface of the rear end 30 of housing 12, prior to assembly of the cap 22 to housing 12 and curing thereof. According to one embodiment, the epoxy 116 may include Model No. Hysol E-40FL, commercially available from Loctite.

During assembly of the rear end cap assembly 22 to housing 12, the end cap or collar 22 slides over the first resilient portion 42 of electrical interconnect 40 and compresses the first resilient portion 42 against electrically conductive ring 112. By compressing the resilient portion 42 between the inner surface 24 of end cap 22 and the underlying electrically conductive ring 112, an electrically conductive path is provided from the electrically conductive strip 40 through metal ring 112 to contact 108 and then to spring 106 and contact disk 102 and finally to spring 114 which is in electrical contact with the negative terminal of the rearmost battery 48. The cap 22 may be made of any of a number of materials. According to one embodiment, the cap 22 is made of a polymeric material, such as thermoplastic. The thermoplastic cap 22 may easily be adhered to the thermoset composite housing 12 by way of adhesive epoxy 116. However, it should be appreciated that cap 22 may be made of other materials, such as a thermoset composite, and preferably is a non-conductive material so as to prevent shorting of the electrical interconnect 40.

The front end cap assembly 14 includes various components that are assembled within lens ring 50 and lens retainer or collar 52. Included in front end cap assembly 14 is an optical lens 60 formed generally at the forward portion of lens ring 50. Optical lens 60 may be integrally formed in lens ring 50, as shown, or may be a distinct component assembled to lens ring 50. Optical lens 60 transmits light and may focus the light beam. Disposed rearward of optical lens 60 is a reflector 62. According to one embodiment, the reflector 62 may abut the inner peripheral surface of optical lens 60. According to another embodiment, lens 60 may be adhered to the inner surface of lens ring 50.

Disposed within the reflector 62 is the light source which, in one embodiment, is a light emitting diode (LED) 64. The LED 64 is shown mounted onto an LED printed circuit board 66. It should be appreciated that the printed circuit board 66 may include various circuit elements, including resistors and other electrical components. The LED 64 may include a pair of power terminals 65A and 65B which extend onto or into the circuit board 66. In turn, the circuit board 66 or the pair of terminals provide electrical contact to supply electrical current for powering the LED 64. In the embodiment shown, LED terminal 65A passes through printed circuit board 66. The light source 64 may include one or more sources of light including visible and non-visible light sources. According to one embodiment, the LED 64 may include a visible white light LED 64 such as Model No. NSP500S, commercially available from Nichia Corporation. According to other embodiments, colored LEDs may be employed, such as a green LED having Model No. NSPG500S, a blue LED having Model No. NSPB500S, and a red LED having Model No. NSPRW500S, all commercially available from Nichia Corporation. It should be appreciated that any of a number of LEDs and/or other light sources may be employed in the light device 10.

Disposed on the rear surface of the printed circuit board 66 is a metal spring 68. The metal spring 68 is in electrical contact with power terminal 65A of the LED 64, according to one embodiment. The metal spring 68, in turn, is in electrical contact with the positive terminal of the forwardmost battery 48. Disposed behind the printed circuit board 66 is a retainer 70 having a receptacle configured to receive and hold the LED circuit board 66 and metal spring 68 in place. In one embodiment, retainer 70 is a non-conductive material, such as plastic. Metal ring 74 which is disposed within lens retainer 52 engages against the outermost traces on LED circuit board 66 to provide electrical contact with a negative contact of the LED circuit board 66 which, in turn, is in electrical contact with power terminal 65B of LED 64. A pair of O-rings 72 are disposed over the threaded portion 56 of the lens retainer to provide a watertight seal between the lens retainer 52 and the lens ring 50. It should be appreciated that the lens ring 50 and the lens retainer 52 are threadingly engaged to one another via the male threading 56 provided on the outer surface of lens retainer 52 and the internal threaded channels 58 provided on lens ring 50, thereby holding the various components of the assembly 14 together.

The front end cap assembly 14 is assembled to the front end 32 of housing 12. In doing so, an inner surface 54 of lens retainer or collar 52 engages the outer surface of the front end 32 of housing 12 and is adhered thereto by an epoxy adhesive 76, such as Hysol E-40FL, commercially available from Loctite. It should be appreciated that the epoxy 76 may be applied to at least one of the inner surface 54 of lens retainer 52 and the outer end surface of end 32 of housing 12, the end cap assembly 14 assembled thereto, and the epoxy adhesive 76 allowed to cure. When assembling the end cap assembly 14 to housing 12, the metal ring (bushing) 74 engages the top surface of the second resilient portion 44 of electrical contact 40 such that the resilient portion 44 is compressed to form a good electrical interconnect. It should be appreciated that the metal ring 74, in turn, is in electrical contact with LED circuit board 66 which is in contact with resistors mounted to the LED circuit board 66, then to power terminal 65B of the LED 64 so as to complete an electrical circuit between the power supply 48 and the 64. It should be appreciated that alternate circuit configurations may be employed, such as providing a conductor around or through the LED circuit board 66 to electrically connect the spring contact 44 to the terminal 65B of LED 64.

According to one embodiment, the lens ring 50 and lens retainer 52 are made of a polymeric material, such as plastic. In doing so, the threading 56 on lens retainer 52 and the threaded channels 58 on lens ring 50 may be easily formed and employed such that the lens ring 50 may be unscrewed from lens retainer 52 when desired, such as to change out the LED 64. By adhering the lens retainer 52 onto the thermoset composite housing 12 via an epoxy 76, the assembly 14 may be fixed thereto without requiring complex threading provided on the housing 12. It should further be appreciated that other materials may be employed to form the lens ring 50 and lens retainer 52.

Referring to FIGS. 8A and 8B, an electrical interconnect 40 is illustrated according to one embodiment. The electrical interconnect 40 includes first and second resilient portions 42 and 44 at opposite first and second ends. In this embodiment, the resilient portions 42 and 44 each include a fold over electrically conductive strip that includes a substantially vertical portion 112 extending from the wider central portion 46. A horizontal portion 122 extends from upstanding portion 120 and is generally folded over to form a V-shaped portion made up of portions 124 and 126 that are bent at an angle between about ninety degrees (90°) and one hundred fifty degrees (150°), and more specifically of about one hundred twenty degrees (120°). According to this embodiment, the upper horizontal portion 122 is engaged by the metal ring 74 or 112 to compress the V-shaped portion of portions 124 and 126 so that portions 124 and 126 are compressed toward portion 122 to form a resilient spring-like contact. When compressed, the V-shaped portion may deform to become substantially flat.

Referring to FIGS. 9A and 9B, an electrical interconnect 40 is illustrated according to a second embodiment. In this embodiment, the first and second resilient portions 42 and 44 each include fold over portions made up of an angled upstanding portion 130 leading to a horizontal portion 132 and a folded over bottom horizontal portion 134. In this embodiment, the fold over portions 132 and 134 are folded over at an angle in the range of about one hundred fifty degrees (150°) to one hundred seventy degrees (170°), and specifically by approximately one hundred sixty degrees (160°) such that they are substantially parallel to one another when compressed, however, it should be appreciated that the bottom portion 134 and upper portion 132 may be at other angles that are not parallel to one another. When the metal ring 74 or 112 engages the upper surface 132, portions 132 and 134 are compressed towards each other to provide a spring-like resilient contact.

Referring to FIGS. 10A and 10B, an electrical interconnect 40 is illustrated, according to a third embodiment. In this embodiment, the resilient portions 42 and 44 are not folded over onto one another, but instead include bent portions that extend outward away from the wide central portion 46. Included is an angled upstanding portion 144 which leads to a substantially horizontal portion 142. Extending from portion 142 is an angled downward portion 144 leads to a bent upward portion 146. The complex configuration of each of the contact strips 142 and 144 forms a spring-like contact that when compressed between the top and bottom portions compresses to provide good electrical contact. It should be appreciated that other configurations of the resilient contacts may be employed in the light device 10.

Figure 11:
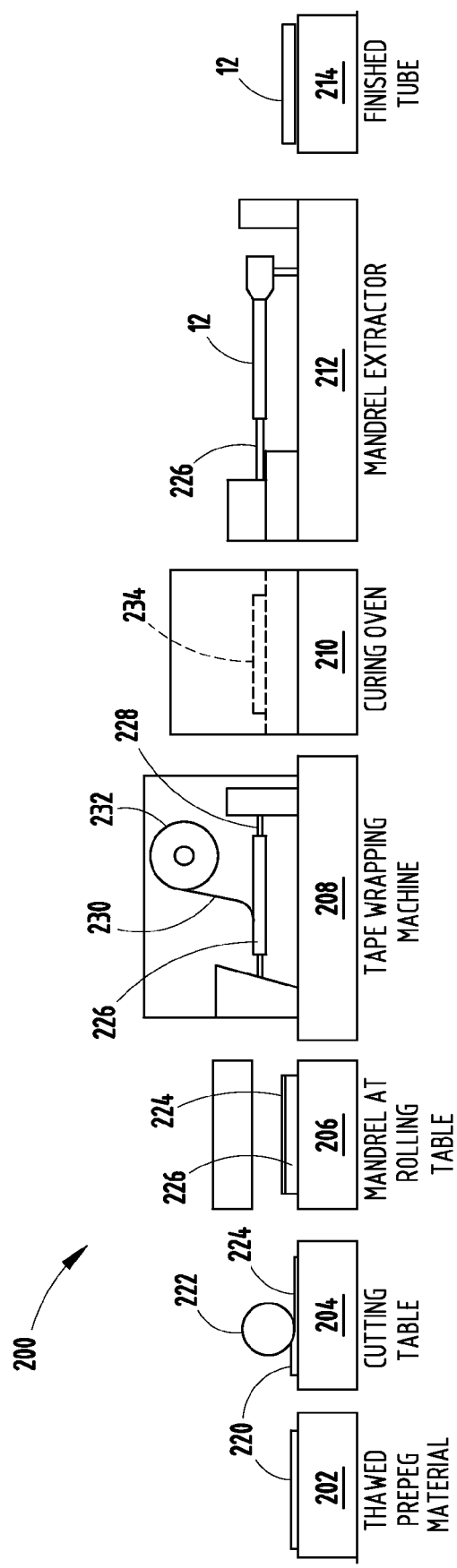
FIG. 11 is a schematic diagram illustrating a method of making the thermoset composite housing of the light device, according to a first embodiment.

The thermoset composite housing 12 of the light device 10 is manufactured according to a method that forms a very thin and strong tubular housing as described herein. Referring to FIG. 11, a method 200 of manufacturing thermoset composite housings for the light device 10 is illustrated according to one embodiment which employs a roll forming technique. Starting at station 202, method 200 provides thawed prepeg material in the form of woven fiber material. The woven fiber material may be woven in advance and impregnated with an epoxy, such as a composite carbon fibre component prepreg material MTM57, manufactured by Advanced Composites Group. The epoxy impregnated woven fiber material (also referred to as prepreg) may be stored in a frozen condition to keep it uncured, and then thawed just prior to the assembly. Next, at station 204, a cutting table is employed with a cutter 222 to cut the epoxy impregnated woven fiber material 220 into individual pieces 224 of a desired size and shape. One or more of the individual pieces of material 224 are then assembled onto a mandrel 226 at the rolling table at station 206. The cut pieces 224 of epoxy impregnated woven fiber material may be rolled onto the mandrel 226 in single or multiple layers, sufficient to achieve a desired thickness. Once the one or more pieces of woven material are applied to the mandrel 226, the mandrel 226 is presented to a tape wrapping machine at station 208, such that tape 230 from the reel 232 is applied onto the epoxy impregnated woven fiber material on the mandrel 226. In doing so, the mandrel 226 may be rotated about its longitudinal axis, if desired. The tape 230 may include expanded polyester (Mylar®) which holds the impregnated woven material and epoxy in place on the mandrel and yet is breathable to allow the epoxy to cure. To complete the curing, the mandrel and material are inserted into a curing oven at station 210 such that the epoxy impregnated woven fiber material on the mandrel is allowed to cure. This may include heating for a time of up to thirty minutes, at a temperature of approximately about two hundred sixty-five degrees Fahrenheit (265° F.). During curing, the epoxy impregnated woven fiber material transforms into a thermoset composite that is rigid and strong. Next, the thermoset composite is extracted from the mandrel at station 212 such that the mandrel 112 and the finished tube 12 is provided at station 214. The finished tube 12 may then be cut to include slots 36 and 38, and may be cut to provide the desired length. The housing 12 may be further processed, such as by grinding, to achieve further variations in shape and may be colored by applying a die or paint. Accordingly, the woven thermoset composite housing 12 can be easily manufactured and made available for assembly into a light device 10.

Figure 12:
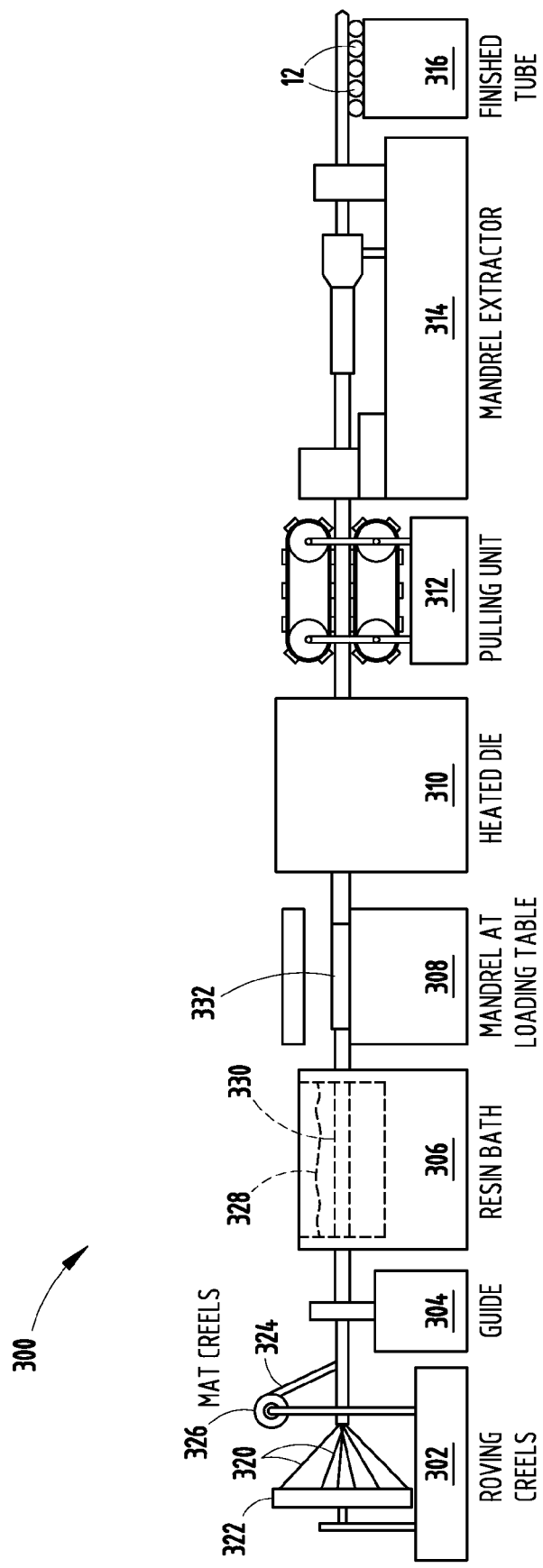
FIG. 12 is a schematic diagram illustrating a method of making the thermoset composite housing, according to a second embodiment.

Referring to FIG. 12, a method 300 of making the thermoset composite housing 12 is illustrated, according to a second embodiment of the present invention. In this embodiment, a protrusion technique is employed which pulls the fibers and the mandrel 332 through various stages of the manufacturing process. Beginning at station 302, roving creels 322 are employed that provide a plurality of fibers 320, such as glass fibers. The plurality of glass fibers 320 are essentially pulled from the roving creels 322 through a guide at station 304, through an epoxy resin bath at station 306 and then onto the mandrel 332 at loading table station 308. Prior to passing through the guide 304, a mat creel 326 provides a mat 330, such as tape, that holds the fibers in positions so they can be applied on the mandrel. Leaving the guide at station 304, the woven fibers on mat 330 pass through the resin bath at station 306 in which the glass fibers and overlaying mat are soaked in the resin, which is liquid epoxy 328, according to one embodiment. The epoxy impregnated fiber and mat 330 then passes to a mandrel 332 at the loading table 308 such that the mat is applied or rolled onto the mandrel 332. Next, the mandrel 332 is pulled into a heated die, such that the epoxy soaked woven fiber mat on the mandrel is allowed to cure. The heated die 310 may provide an elevated temperature of about two hundred sixty-five degrees Fahrenheit (265° F.) for a time period of up to thirty minutes. Following curing in the die, the formed thermoset composite and mandrel are advanced by way of pulley 312 onto an extractor at station 314 which extracts the cured thermoset composite from the mandrel to provide for the finished tubes 12 at station 316. Accordingly, the glass fibers may be wound into a desired pattern, impregnated with an epoxy resin and applied to the mandrel, via a protrusion process according to this embodiment.

Figure 13:
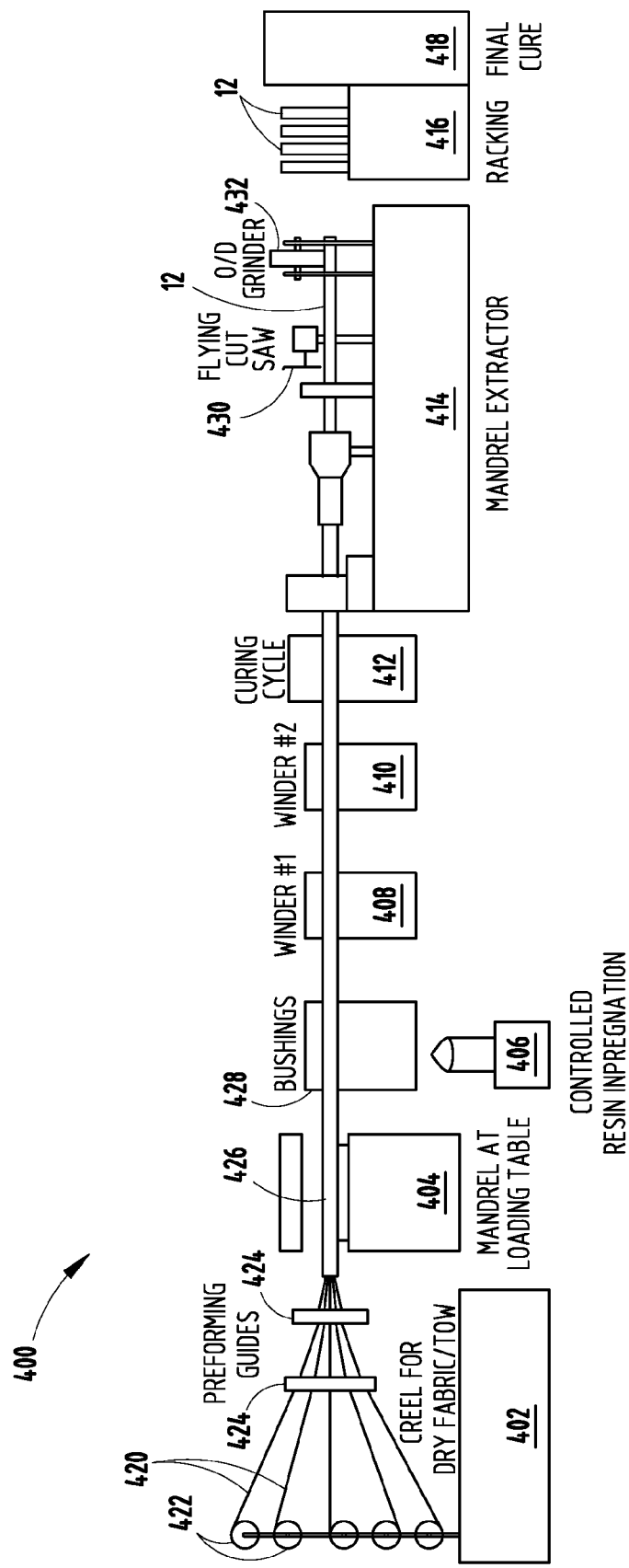
FIG. 13 is a schematic diagram illustrating a method of making the thermoset composite housing, according to a third embodiment.

Referring to FIG. 13, a method 400 of making the thermoset composite housing 12 is illustrated according to a third embodiment. In this embodiment, beginning at station 402, a plurality of individual fibers, such as glass fibers 420, are provided by reels 422. The glass fibers 420 pass through performing guides 424, and then pass to a mandrel 426 at a loading table at station 404 such that the fibers are wound and applied onto the mandrel 426 in a desired pattern. The mandrel with the woven fibers is then advanced to station 406 which impregnates a controlled amount of resin epoxy onto the woven fiber mat on the mandrel 426 and the mandrel 426 passes through bushings 428. Next, the mandrel passes through first and second winders at stations 408 and 410, and then to a curing cycle at station 412. The curing cycle may include heating the resin impregnated woven fiber material to an elevated temperature of about three hundred degrees Fahrenheit to four hundred degrees Fahrenheit (300° F. to 400° F.), for a desired time period of about thirty minutes to ninety minutes to form the thermoset composite. Once the thermoset composite is cured, the mandrel is extracted at station 414 and a flying cut saw 430 may cut the individual housings 12 to a desired length and an outside diameter grinder 432 may be employed to grind the surface, if desired. The individual housings 12 are shown stacked vertically at station 416 and a final cure is provided at station 418. The tubes 12 may further be processed to include slots 36 and 38 and other desired features.

Accordingly, the method of forming the thermoset composite housing 12 for light device 12 may include any one of the three embodiments or combinations of process steps set forth above. It should be appreciated that other variations to the manufacturing method may be employed.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

What is claimed is:
1. A light device comprising:
   a light source;
   electrical circuitry for supplying electrical power to the light source;
   a housing having first and second ends and a hollow interior defining a compartment for holding a power source, the housing comprising a woven thermoset composite, wherein the electrical circuitry comprises an electrically conductive strip having a first resilient portion for providing electrical connection to the power supply and a second resilient portion for providing electrical connection to the light source;

a first collar on the first end of the housing contacting and compressing the first resilient portion radially inward into engagement with a first conductive element; and a second collar on the second end of the housing contacting and compressing the second resilient portion radially inward into engagement with a second conductive element.

2. The light device of claim 1, wherein the thermoset composite has a thickness of less than 2.54 mm.

3. The light device of claim 1, wherein the thermoset composite has a thickness and an outside diameter, and a ratio of the thickness to the outside diameter is less than 0.07.

4. The light device of claim 1, wherein the woven thermoset composite comprises a woven fiber material and an epoxy.

5. The light device of claim 4, wherein the fiber material comprises glass fibers.

6. The light device of claim 4, wherein the woven fiber material and the epoxy are applied to a mandrel to form the housing.

7. The light device of claim 6, wherein the epoxy is applied to the fiber material as the fiber material is weaved onto the mandrel.

8. The light device of claim 1, wherein the housing comprises an elongated cylindrical portion made of the woven thermoset composite.

9. The light device of claim 1, wherein the first and second resilient portions each comprise fold over strips.

10. The light device of claim 1 further comprising a power source disposed in the hollow interior of the housing.

11. The light device of claim 9, wherein the power source comprises one or more batteries.

12. The light device of claim 1, wherein the light source comprises a light emitting diode.

13. The light device as defined in claim 1 further comprising a first end cap adhered by an adhesive to the first end of the housing, and a second end cap adhered by an adhesive to the second end of the housing.

14. The light device of claim 1, wherein the light device further comprises a push button switch located at the first end of the housing, and wherein the light source is located at the second end of the housing.

15. The light device of claim 9, wherein the fold over strips each comprise a first portion folded substantially over a second portion such that the first and second portions provide a spring bias when compressed toward one another.

16. A light device comprising: a housing having a hollow interior, a first end and a second end, the hollow interior defining a compartment for holding a power source;

a light source;

electrical interconnect circuitry for supplying electrical power to the light source, said electrical interconnect circuitry comprising an electrically conductive strip having first and second resilient portions that form first and second spring contacts, wherein the first and second spring contacts provide electrical connection between the power source and the light source, wherein the first and second resilient portions each comprise fold over portions of conductive material;

a first collar on the first end of the housing contacting and compressing the first spring contact radially inward into engagement with a first conductive element; and a second collar on the second end of the housing contacting and compressing the second spring contact radially inward into engagement with a second conductive element.

17. The light device of claim 16, wherein the fold over portions of conductive material comprise a first portion folded substantially over a second portion such that the first and second portions provide a spring bias when compressed toward one another.

18. The light device of claim 16 further comprising a power source disposed in the compartment.

19. The light device of claim 18, wherein the power source comprises at least one battery.

20. The light device of claim 16, wherein the first and second collars are connected to the first and second ends of the housing by an adhesive.

21. The light device of claim 20, wherein the adhesive comprises epoxy.

22. The light device of claim 16, wherein the first collar comprises a first cap connected to the first end of the housing, and the second collar comprises a second cap connected to the second end of the housing.

23. The light device of claim 22, wherein the first cap includes a switch and the second cap includes the light source.

24. The light device of claim 16 further comprising a switch at the first end of the housing, wherein the switch is a push button switch.

25. The light device of claim 16, wherein the electrically conductive strip comprises a central portion between the first and second resilient portion, wherein the central portion is wider than the first and second resilient portions.

26. The light device of claim 25, wherein the central portion is C-shaped.

27. A fight device comprising:

a housing having first and second ends and a hollow interior defining a compartment, wherein the housing comprises a woven thermoset composite;

a fight source disposed in the housing near the first end; a power source disposed in the housing near the second end; and electrical circuitry for supplying electrical power from the power source to the fight source, the electrical circuitry comprising an electrically conductive strip disposed in the hollow interior of the housing;

wherein the electrically conductive strip comprises a first resilient portion and a second resilient portion;

a first collar on the first end of the housing contacting and compressing the first resilient portion of the electrically conductive strip radially inward into engagement with a first conductive element operatively coupled to the power source;

and a second collar on the second end of the housing contacting and compressing the second resilient portion of the electrically conductive strip radially inward into engagement with a second conductive element operatively coupled to the light source.

28. The light device of claim 27, wherein the first and second resilient portions each comprise fold over strips.

29. The light device of claim 27, wherein the woven thermoset composite comprises a woven fiber and an epoxy, wherein the electrically conductive contact strip is disposed on an interior surface of the housing.

30. The light source of claim 27 further comprising a channel extending longitudinally in the interior of the housing, wherein the electrically conductive strip is disposed within the channel.

31. The light device of claim 27, wherein the electrically conductive strip is disposed on a surface of the woven thermoset composite.

* * * * *